United States Patent
Oomen et al.

[11] Patent Number: 5,933,456
[45] Date of Patent: Aug. 3, 1999

[54] TRANSMITTER FOR AND METHOD OF TRANSMITTING A WIDEBAND DIGITAL INFORMATION SIGNAL, AND RECEIVER

[75] Inventors: Arnoldus W. J. Oomen, Eindhoven; Marc E. Groenewegen, Utrecht; Robbert G. Van Der Waal, Eindhoven, all of Netherlands

[73] Assignee: U.S. Philips Corporation, New York, N.Y.

[21] Appl. No.: 08/768,353

[22] Filed: Dec. 17, 1996

[30] Foreign Application Priority Data

Jan. 12, 1996 [EP] European Pat. Off. .............. 96200063

[51] Int. Cl.⁶ .................................................. H04L 27/04
[52] U.S. Cl. ........................ 375/295; 375/372; 375/240; 348/205
[58] Field of Search ..................... 375/240, 372, 375/241, 295; 704/229, 203, 204; 395/2.39, 2.14, 2.38; 381/2; 348/419, 405, 415, 420, 404

[56] References Cited

U.S. PATENT DOCUMENTS

| | | | |
|---|---|---|---|
| 5,214,507 | 5/1993 | Aravind et al. | 548/390 |
| 5,289,507 | 2/1994 | Upp | 375/372 |
| 5,333,012 | 7/1994 | Signghal et al. | 348/405 |
| 5,339,338 | 8/1994 | Elliott | 375/372 |
| 5,440,596 | 8/1995 | Kneepkens et al. | 375/240 |

FOREIGN PATENT DOCUMENTS

| | | |
|---|---|---|
| 0400755A1 | 12/1990 | European Pat. Off. . |
| 0402973A1 | 12/1990 | European Pat. Off. ........ G11B 20/10 |
| 0457390A1 | 11/1991 | European Pat. Off. .......... H04B 1/66 |
| 0457391A1 | 11/1991 | European Pat. Off. .......... H04B 1/66 |
| 0597349A1 | 5/1994 | European Pat. Off. . |
| 0646796A1 | 4/1995 | European Pat. Off. ........ G01P 3/486 |
| 8807297A1 | 9/1988 | WIPO . |

*Primary Examiner*—Stephen Chin
*Assistant Examiner*—Shuwany Liu
*Attorney, Agent, or Firm*—Steven R. Biren

[57] ABSTRACT

A transmitter provided with a subband coder is disclosed. The transmitter receives a wideband digital information at an input 1 and provides an output signal for transmission at an output (30). The input signal may have a varying sampling frequency ($f_g$). The bitrate of the output signal is substantially constant. In order to compensate for the varying sampling frequency of the input signal, the transmitter is provided with a buffer memory (8) and a detector (18) for determining the filling degree of the memory (8). The control signal so derived, which is representative of the filing degree, is supplied to the bitallocation information generation unit (10). The bitpool B is varied in response to the control signal so as to control the filling degree to a nominal value, such as half full (FIG. 1). Further a receiver is disclosed for receiving the transmitted wideband digital information signal.

5 Claims, 1 Drawing Sheet

5,933,456

TRANSMITTER FOR AND METHOD OF TRANSMITTING A WIDEBAND DIGITAL INFORMATION SIGNAL, AND RECEIVER

BACKGROUND OF THE INVENTION

The invention relates to a transmitter for transmitting a wideband digital information signal, the transmitter comprising:

an input terminal for receiving the wideband digital information signal, signal splitter means for splitting the digital information signal into M sub signals, each one of the sub signals being representative of a component of the wideband digital information signal which is present in a corresponding one of M adjacent narrow bands in the frequency band of the wideband digital information signal, where M is an integer larger than 1, quantizing means for quantizing samples comprised in a macroblock, a macroblock comprising the samples present in time equivalent signal blocks comprised in the sub signals, one signal block in a sub signal, each signal block comprising q of the samples of a sub signal, the quantizing means being adapted to quantize the samples present in said macroblock into quantized samples in response to bit allocation information supplied to the quantizing means so as to obtain a quantized macroblock comprising corresponding time equivalent blocks of quantized samples, bit allocation information derivation means for deriving bit allocation information for subsequent macroblocks, the bit allocation information comprising for each of the time equivalent signal blocks in a macroblock a bit allocation value representative of the number of bits with which the q samples in a signal block will be represented after quantization in the quantizing means, the bit allocation information derivation means being adapted to derive the bit allocation information for a macroblock in response to a number B of bits which is available for quantization of the samples in the macroblock so as to obtain the quantized macroblock of quantized samples, formatter means for combining the quantized samples comprised in a quantized macroblock into a digital output signal having a format suitable for transmission, to a method of transmitting said wideband digital information signal and to a receiver for receiving the wideband digital information signal. The wideband digital information signal can be an wideband digital audio signal.

A transmitter as defined in the opening paragraph is known from EP-A 457,390 and EP-A 457,391, the documents (D1) and (D2) respectively, in the list of references given below. More specifically, in a bit allocation step, the powers in each of the subbands are calculated by squaring the sample values present in time equivalent signal blocks of the subband signals and summing the squared sample values in a time equivalent signal block. The signal blocks in the documents listed above are of constant length and are 12 samples long. The powers thus obtained are processed in a processing step in which use is made of a psycho acoustic model so as to obtain masked threshold values. Another way of obtaining the masked threshold values is by carrying out separately a Fourier transform on the wideband digital information signal and applying the psycho acoustic model on the Fourier Transform results. The masked threshold values, together with the scale factor information, result in bitneeds $b_1$ to $b_M$ for the samples in the time equivalent signal blocks of the M subband signals. Next, those bitneed values are used so as to allocate B bits, that are available in a bitpool of B bits, to the samples, resulting in the bitallocation information values $n_1$ to $n_M$, $n_m$ indicating the number of bits with which each of the 12 samples in the signal block of subband m are represented, after having carried out a quantization on the samples in the subbands.

In the prior art transmitter, which receives a wideband digital information signal sampled with a sampling frequency of 48 kHz, the total frequency band to be encoded is 24 kHz. This frequency band is split into 32 narrow bands of equal width, so that they have a constant width of substantially 750 Hz each. For transmitting speech signals, the frequency band of interest of the wideband digital information signal may be 4 kHz wide, which may be split into e.g. four narrow bands.

In the formatter means, the quantized samples (and generally also the bit allocation information) are combined and converted into an output signal suitable for transmission. The output signal is transmitted with a substantially constant bitrate.

Investigations have resulted in the knowledge that the output signal may sometimes be distorted.

SUMMARY OF THE INVENTION

The invention has for its object to provide an improved transmitter and an improved encoding method so that the output signal is less distorted.

In accordance with the invention, the transmitter is characterized in that the formatter means comprise a buffer memory for storing quantized samples, filling degree detection means for detecting the filling degree of the buffer memory and generating a filling degree detection signal in response to said filling degree, the bit allocation information derivation means being provided with a control signal input for receiving the filling degree detection signal.

More specifically, the transmitter is characterized in that the bit allocation information derivation means is adapted to change the number B in response to the filling degree detection signal.

The method of transmitting a wideband digital information signal, to be carried out in a transmitter as claimed in any one of the preceding claims, the method comprising the steps of:

receiving the wideband digital information signal, splitting the digital information signal into M sub signals, each one of the sub signals being representative of a component of the wideband digital information signal which is present in a corresponding one of M adjacent narrow bands in the frequency band of the wideband digital information signal, where M is an integer larger than 1, quantizing samples comprised in a macroblock, a macroblock comprising the samples present in time equivalent signal blocks comprised in the sub signals, one signal block in a sub signal, each signal block comprising q of the samples of a sub signal, the quantizing means being adapted to quantize the samples present in said macroblock into quantized samples in response to bit allocation information supplied to the quantizing means so as to obtain a quantized macroblock comprising corresponding time equivalent blocks of quantized samples, deriving bit allocation information for subsequent macroblocks, the bit allocation information comprising for each of the time equivalent signal blocks in a macroblock a bit allocation value representative of the number of bits with which the q samples in a signal block will be represented after quantization in the quantizing means, by deriving the bit allocation information for a macroblock in response to a number B of bits which is available for quantization of the samples in the macroblock so as to obtain the quantized macroblock of quantized samples, combining the quantized samples comprised in a quantized macroblock and the corresponding bit allocation information into a digital output signal having a format suitable for transmission, is characterized in that the method further comprises the steps of storing quantized samples in a buffer memory, detecting a filling degree of the buffer memory and generating a filling degree detection signal in response to said filling degree, the bit allocation information derivation step further comprising the substep of receiving the filing degree detection signal.

The invention is based on the recognition that the wideband digital information signal received by the transmitter may sometimes be of non-stationary character, more specifically, has a varying sampling frequency. This may result in a non constant bitrate of the output signal to be transmitted. When received by a prior art receiver, this output signal will result in a false decoding, assuming that the receiver has its own internal clock frequency for clocking the incoming signal. Locking the internal clock frequency of the receiver to the (non-constant) bitrate of the output signal of the transmitter is generally not possible as the transmission path between the transmitter and the receiver includes a channel encoding and corresponding decoding step, which has its own fixed clock frequency.

In accordance with the invention, the transmitter is provided with a buffer for storing the quantized samples prior to transmission. The filing degree of the buffer is established and a control signal is generated being representative of the filing degree of the buffer. When the sampling frequency, and thus the input bitrate of the incoming wideband digital information signal varies, this leads to variations in the filling degree of the buffer. By supplying the control signal, which is indicative of said filling degree, it is possible to compensate for those variations in the incoming wideband digital information signal, by varying the value B, which is the bitpool available for quantization of the sub(band) samples. As a result, a digital output signal is now transmitted with a constant bitrate.

More specifically, the bit allocation information derivation means is adapted to change the number B in response to the filling degree detection signal, in such a manner that B is increased in the case that the filling degree decreases and that B is decreased in the case that the filling degree increases.

As a result, the variations in the sampling frequency of the wideband digital signal are compensated for, so that an output signal having a substantially constant bitrate has been obtained for transmission.

It should be noted that it is well known to compensate for variations in an information signal reproduced from a longitudinal record carrier, using a buffer memory, by determining the filling degree of the buffer. The control signal thus obtained is used however for controlling the transport velocity of the record carrier. Reference is made in this respect to EP-A 646,796 document D3 in the list of related documents.

BRIEF DESCRIPTION OF THE DRAWING

These and other objects of the invention will be further elucidated in the following figure description, in which.

DESCRIPTION OF THE PREFERRED EMBODIMENTS

Figure 1:
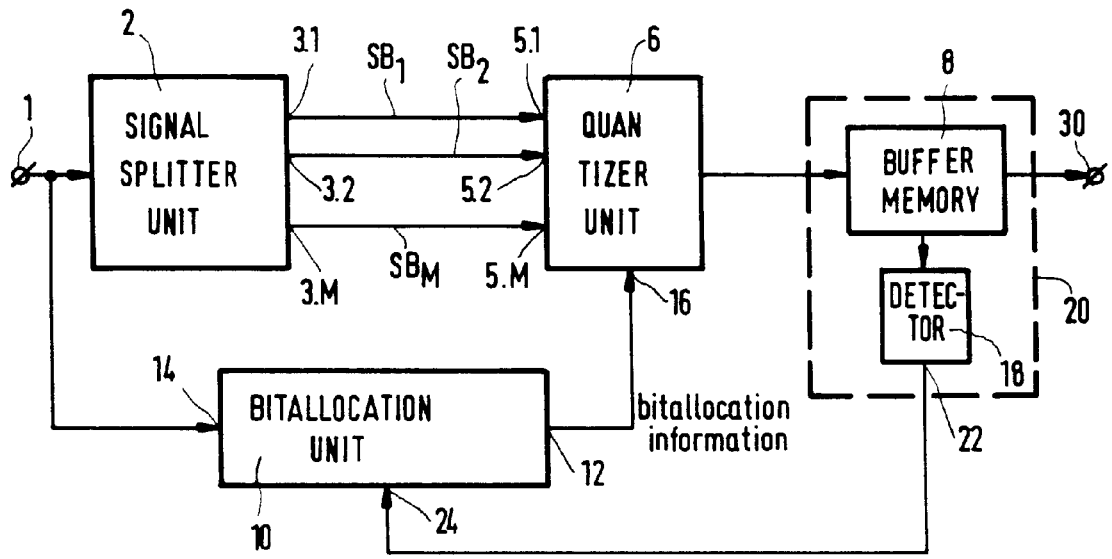
FIG. 1 shows an embodiment of the transmitter and FIG. 2 shows an embodiment of the receiver.

FIG. 1 shows a transmitter comprising an input terminal 1 for receiving a wideband digital information signal, such as a wideband digital audio signal, sampled with a sampling rate of 44.1 or 48 kHz. The wideband digital signal is supplied to a subband splitter unit 2 in which the wideband digital signal is subjected to a filtering. In the present example, the splitter unit 2 divides the total frequency band of 48 kHz into M(=4) subbands of constant bandwidth. The subbands have a bandwidth of 6 kHz each. As a result M(=4) subband signals $SB_1$ to $SB_M$ are derived at the outputs 3.1 to 3.M of the splitter unit 2. The sampling rate of the subband signals has been down converted in the splitter unit 2 by a factor of M, so that the total data rate at the output of the splitter unit 2 equals the data rate of the wideband digital signal received at the input 1. Embodiments of a splitter unit can be found in document (D4) in the list of references. More specifically, a signal portion of a specific length of the wideband digital signal, obtained by windowing the wideband digital signal with a time window of said specific length, is applied to the input of the splitter unit 2 and results in one sample at each of the outputs 3.1 to 3.M of the splitter unit 2. Next, the time window is shifted in time over a short time period and the signal portion of the wideband digital signal now obtained results in the next one sample at each of the outputs of the splitter unit 2. Subsequent time windows shifted over said short time period will overlap. All time windows can have the same length.

The subband signals $SB_1$ to $SB_M$ are supplied to inputs 5.1 to 5.M respectively of a quantizing unit 6. Generally, first, a normalization is carried out on a macroblock of samples. A macroblock of samples comprises M time equivalent signal blocks, one signal block in each of the subbands. Each signal block has a length of q samples. In order to carry out normalization, the unit 6 determines for each signal block in a subband signal and for the signal blocks in all the subband signals a scale factor. This scale factor has a relation to the largest sample value of the signal block. Next, normalization is realized by dividing the samples in a signal block by its corresponding scale factor. As a result, normalized subband samples are obtained.

Next, the q normalized samples in the M signal blocks in the macroblock, are quantized in response to bitallocation information supplied to an input 16. The quantizer unit 6 quantizes the M signal blocks of the q normalized subband samples each by representing the normalized samples in a signal block of the subband signal $SB_m$ by $n_m$ bits per sample so as to obtain quantized normalized samples in said signal block.

The macroblock of M×q quantized samples is supplied to a buffer memory 8 for storage. The buffer memory 8 is part of a formatter unit 20, which may comprise further elements in order to realize its functioning. The formatter unit 20 may, amongst others, receive the scale factors discussed above via an input (not shown) and the bitallocation information via an input (not shown). The formatter unit 20 combines the signals into a serial datastream, carries out a channel encoding, if necessary, so as to convert the serial datastream into a coded digital signal suitable for transmission via a transmission medium, or for recording on a transmission medium in the form of a record carrier. Reference is made to EP-A 402,973, document (D5) in the list of documents, which shows a prior art formatter unit 20. It should be stressed here, that the channel encoding step should be applied to the output signal of the buffer unit 8.

Further, a bitallocation information derivation unit 10 is present which derives the bitallocation information, the values $n_1$ to $n_M$ introduced above, at an output 12, which output is coupled to the input 16 of the quantizer unit 6.

The unit 10 derives the bit allocation information from the original wideband information signal. To that purpose, the input 14 of the unit 10 is coupled to the input terminal 1.

A Fourier transform is carried out on a signal portion of the wideband digital signal that corresponds to the macroblock of M time equivalent signal blocks of the sub signals, so as to obtain a power spectrum of the wideband digital signal. The frequency components of the power spectrum in each of the subbands are combined so as to obtain one composite frequency component in each of the subbands and a masked threshold in each of the subbands is derived from the composite frequency components in each of the subbands. Or, the frequency components of the power spectrum in each subband are used to derive the masked threshold in the said subband.

Another way of deriving the masked thresholds in the subbands is described in the documents (D1) and (D2). In the embodiment of the unit 10 disclosed in D1 and D2, the unit 10 may comprise a splitter unit as well, or may receive the output signals of the splitter 2. The unit 10 calculates the signal powers $v_m$ by squaring the sample values in the signal blocks of a subband signal $SB_m$ and summing the squared sample values. By means of a matrix manipulation carried out on the M signal powers $v_m$, magnitudes $w_m$ can be derived being representative of the masked threshold in the time equivalent signal blocks of the subband signals $SB_1$ to $SB_M$.

Those magnitudes $w_m$ are used to derive the bitallocation information therefrom, using a value B, being the number of bits available in a bit pool for allocation purposes.

It should be noted that it is known what the bitrate required for transmitting the quantized subband signal samples is. It is assumed that this bitrate is A kbit/s, where A may be for example 128. This means that for each millisecond of the wideband digital signal, 128 bits are available in the bitpool for allocation purposes. As a result, when allocating bits to time equivalent signal blocks comprising 12 samples and having a length of L milliseconds, 128.L bits are available in the bitpool for allocation purposes. As a result, B equals A×L.

The buffer memory 8 is provided with a detection unit 18 for determining the filling degree of the memory 8 and for generating a control signal at an output 22 indicative of the filling degree. The output 22 of the unit 18 is coupled to a control input 24 of the unit 10. The unit 10 is adapted to vary the value B for the available bit pool in response to the control signal applied to the input 24.

The sampling frequency of the wideband digital signal applied to the input 1 may vary due to external circumstances. Suppose that in a nominal situation, for a constant bitrate $f_b$ of the output signal applied at the output 30, the sampling frequency of the wideband signal must have a nominal value $f_s$ and the bitpool must be B bits large. In such a situation, it is assumed that the filling degree of the memory is half full. As a result, as many bits are supplied by the unit 6 to the memory 8, as there are supplied to the output 30, per time unit.

In a situation where the sampling frequency $f_s$ decreases, less subband samples will be generated per time unit. As a consequence, less bits are supplied by the unit 6 to the memory 8. As the output signal is supplied to the output 30 with a constant bitrate $f_b$, this results in the filling degree to decrease. In the reverse situation, when $f_s$ increases, more samples than nominal are supplied by the unit 6 to the memory 8. As a consequence, the filling degree in the memory 8 increases.

In response to the control signal applied to the input 24, the bitallocation information generation unit varies the value B for the bit pool in such a way that, when the filling degree decreases, the value for B is increased and if the filling degree increases, the value for B is decreased.

This results in the following behaviour. When the sampling frequency of the wideband digital information signal decreases, this leads in the beginning to a decrease of the filling degree. As a result, more bits are allocated to a macroblock of samples than in the nominal situation, such that the filling degree is controlled towards a half-full situation. In the reverse situation, when the sampling frequency increases, this leads in the beginning to an increase of the filling degree. As a result, less bits are allocated to a macroblock of samples than in the nominal situation, such that the filling degree is again controlled towards a half fill situation.

In this way, an input signal of varying sampling frequency is converted into an output signal of substantially constant bitrate.

Figure 2:
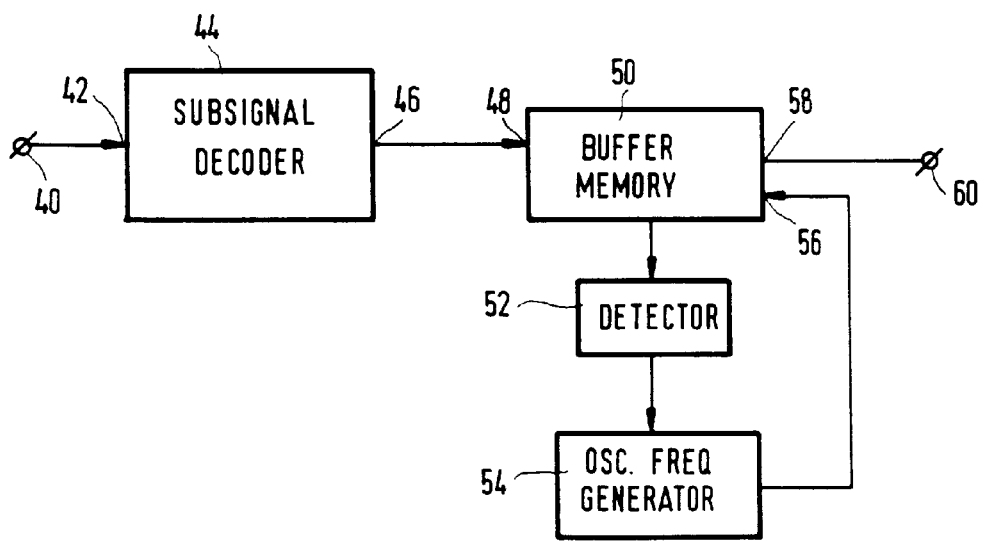

FIG. 2 shows schematically an embodiment of a receiver that receives the channel encoded signal, generated by the transmitter at its output 30. The received channel encoded signal is channel decoded in a channel decoder (not shown) and subsequently applied to the input terminal 40 and supplied to an input 42 of a decoder unit 44. This decoder unit 44 is in the form of a subband decoder unit, if the transmitter in accordance with the invention is provided with a subband encoder. If the transmitter comprises a transform encoder, it will be evident that the decoder unit 44 is in the form of a transform decoder. Subband decoders and transform decoders are well known in the art, so that no further description of the decoder unit 44 will be given. It suffices to indicate here that the decoder 44 comprises a dequantizing unit for dequantizing the quantized samples so as to obtain replicas of the M sub signals and a signal combining unit for combining the replicas of the M sub signals. In this well known way, the decoder unit 44 generates a replica of the wideband digital information signal supplied to the input 1. The replica is supplied via its output 46 to the input 48 of a buffer memory 50. The buffer memory 50 is a memory of the first-in-first-out type. A filling degree detector unit 52 is present for determining the filling degree of the buffer memory 50. In response to the filling degree, the detector unit 52 generates a control signal which is supplied to an oscillation frequency generator 54. The generator 54 generates a pulse signal having a specific frequency which is controlled by the control signal supplied by the detector unit 52. This pulse frequency is supplied to a clock signal input 56 of the buffer memory 50. This clock frequency is the clock frequency with which the samples of the replica of the wideband digital information signal stored in the buffer memory 50 are supplied to the output 58 of the buffer memory 50, and thus to the output terminal 60.

Upon decoding in the decoder unit 44, samples of the replica of the wideband digital information signal are stored in the buffer memory 50 with a rate dictated by the decoder unit 44. The samples are read out from the buffer memory under the influence of the clock frequency supplied to the clock input 56. If the detector unit 52 detects that the filling degree decreases, it generates a control signal such that the clock frequency supplied to the clock input 56 decreases. Conversely, when the detector unit 52 detects that the filling degree increases, it generates a control signal such that the clock frequency supplied to the clock input 56 increases. In this way, the filling degree of the buffer memory 50 can be controlled towards e.g. a half-full situation, whilst the replica of the wideband digital information signal is obtained.

Whilst the present invention has been described with respect to preferred embodiments thereof, it is to be understood that these are not limitative examples. Thus, various modifications may become apparent to those skilled in the art, without departing from the scope of the invention as defined in the appended claims. Further, it should be noted that other ways of determining the bitallocation information exist, even without making use of a psycho-acoustic model. Further, the invention lies in each and every novel feature or combination of features as herein disclosed.

List of related documents cited as prior art in this application:

(D1) EP-A 457,390
(D2) EP-A 457.391
(D3) EP-A 646,796
(D4) EP-A 400.755
(D5) EP-A 402,973

We claim:

1. Transmitter for transmitting a wideband digital audio information signal, the transmitter comprising:

an input terminal for receiving the wideband digital information signal, signal splitter means for splitting the digital information signal into M sub signals, each one of the sub signals being representative of a component of the wideband digital information signal which is present in a corresponding one of M adjacent narrow bands in the frequency band of the wideband digital information signal, where M is an integer larger than 1, quantizing means for quantizing samples comprised in a macroblock, a macroblock comprising the samples present in time equivalent signal blocks comprised in the sub signals, one signal block in a sub signal, each signal block comprising q of the samples of a sub signal, the quantizing means being adapted to quantize the samples present in said macroblock into quantized samples in response to bit allocation information supplied to the quantizing means so as to obtain a quantized macroblock comprising corresponding time equivalent blocks of quantized samples, bit allocation information derivation means for deriving bit allocation information for subsequent macroblocks, the bit allocation information comprising for each of the time equivalent signal blocks in a macroblock a bit allocation value representative of the number of bits with which the q samples in a signal block will be represented after quantization in the quantizing means, the bit allocation information derivation means being adapted to derive the bit allocation information for a macroblock in response to a number B of bits which is available for quantization of the samples in the macroblock so as to obtain the quantized macroblock of quantized samples, formatter means for combining the quantized samples comprised in a quantized macroblock into a digital output signal having a format suitable for transmission, wherein the formatter means comprises:

a buffer memory for storing quantized samples, and filling degree detection means for detecting the filling degree of the buffer memory and generating a filling degree detection signal in response to said filling degree, the bit allocation information derivation means being provided with a control signal input for receiving the filling degree detection signal.

2. Transmitter as claimed in claim 1, wherein the bit allocation information derivation means is adapted to change the number B in response to the filling degree detection signal.

3. Transmitter as claimed in claim 2, wherein the bit allocation information derivation means is adapted to change the number B in response to the filing degree detection signal, in such a manner that B is increased in the case that the filling degree decreases and that B is decreased in the case that the filling degree increases.

4. Transmitter as claimed in claim 1, wherein the formatter means being adapted to generate a digital output signal at a substantially constant bitrate.

5. Method of transmitting a wideband digital audio information signal, the method comprising the steps of:

receiving the wideband digital information signal, splitting the digital information signal into M sub signals, each one of the sub signals being representative of a component of the wideband digital information signal which is present in a corresponding one of M adjacent narrow bands in the frequency band of the wideband digital information signal, where M is an integer larger than 1, quantizing samples comprised in a macroblock, a macroblock comprising the samples present in time equivalent signal blocks comprised in the sub signals, one signal block in a sub signal, each signal block comprising q of the samples of a sub signal, the quantizing means being adapted to quantize the samples present in said macroblock into quantized samples in response to bit allocation information supplied to the quantizing means so as to obtain a quantized macroblock comprising corresponding time equivalent blocks of quantized samples, deriving bit allocation information for subsequent macroblocks, the bit allocation information comprising for each of the time equivalent signal blocks in a macroblock a bit allocation value representative of the number of bits with which the q samples in a signal block will be represented after quantization in the quantizing means, by deriving the bit allocation information for a macroblock in response to a number B of bits which is available or quantization of the samples in the macroblock so as to obtain the quantized macroblock of quantized samples, combining the quantized samples comprised in a quantized macroblock and the corresponding bit allocation information into a digital output signal having a format suitable for transmission, wherein the method further comprises the steps of:

storing quantized samples in a buffer memory, and detecting a filing degree of the buffer memory and generating a filling degree detection signal in response to said filing degree, the bit allocation information derivation step further comprising the substep of receiving the filling degree detection signal.

* * * * *